United States Patent
Monesi et al.

(10) Patent No.: US 12,398,216 B2
(45) Date of Patent: Aug. 26, 2025

(54) PROCESS FOR MODIFYING THE SURFACE POLARITY OF RUBBER SUBSTRATES

(71) Applicant: Henkel AG & Co. KGaA, Duesseldorf (DE)

(72) Inventors: Alessio Monesi, Albizzate (IT); Eleonora Salmoiraghi, Sedriano (IT); Marco Signorile, Vellezzo Bellini (IT); Giorgio Zaffaroni, Suno (IT)

(73) Assignee: Henkel AG & Co. KGaA, Duesseldorf (DE)

(*) Notice: Subject to any disclaimer, the term of this patent is extended or adjusted under 35 U.S.C. 154(b) by 891 days.

(21) Appl. No.: 17/449,283

(22) Filed: Sep. 29, 2021

(65) Prior Publication Data
US 2022/0017652 A1     Jan. 20, 2022

Related U.S. Application Data

(63) Continuation of application No. PCT/EP2020/057906, filed on Mar. 23, 2020.

(30) Foreign Application Priority Data

Mar. 29, 2019 (EP) .................................. 19166067

(51) Int. Cl.
| | |
|---|---|
| *C08C 19/14* | (2006.01) |
| *C09J 5/02* | (2006.01) |
| *C09J 163/00* | (2006.01) |
| *C09J 175/02* | (2006.01) |
| *C09J 183/04* | (2006.01) |

(52) U.S. Cl.
CPC ................ *C08C 19/14* (2013.01); *C09J 5/02* (2013.01); *C09J 163/00* (2013.01); *C09J 175/02* (2013.01); *C09J 183/04* (2013.01)

(58) Field of Classification Search
USPC ............................... 525/332.3, 344; 428/462
See application file for complete search history.

(56) References Cited

U.S. PATENT DOCUMENTS

| | | |
|---|---|---|
| 4,500,685 A | 2/1985 | Ogawa et al. |
| 4,659,779 A | 4/1987 | Bagga et al. |
| 5,069,927 A * | 12/1991 | Lawson .................. C08J 7/043 525/359.1 |
| 5,330,601 A | 7/1994 | Gottschalk |
| 5,872,190 A * | 2/1999 | Gutowski ................ C08J 7/126 525/332.8 |
| 2006/0013895 A1 | 1/2006 | Wollwage |
| 2007/0276062 A1 | 11/2007 | Tirelli et al. |
| 2012/0094882 A1 | 4/2012 | Mackles et al. |
| 2018/0118903 A1 * | 5/2018 | Zaffaroni ............... C09J 175/02 |

FOREIGN PATENT DOCUMENTS

| | | |
|---|---|---|
| CL | 199902864 | 12/1999 |
| CL | 201001125 A1 | 12/2010 |
| CN | 1726097 A | 1/2006 |
| CN | 101970720 A | 2/2011 |
| EP | 0349120 A2 | 1/1990 |
| GB | 893439 A | 4/1962 |
| JP | S53117080 A | 10/1978 |
| JP | 2002003797 A | 1/2002 |
| JP | 2002069389 | 3/2002 |
| JP | 2015137304 A | 7/2015 |
| WO | 0053638 A1 | 9/2000 |
| WO | 0078911 A1 | 12/2000 |
| WO | 0005363 A1 | 2/2002 |
| WO | 2015086778 A1 | 6/2015 |

OTHER PUBLICATIONS

Machine-generated English language translation of Description of JP2002069389A, 6 pages, retrieved from Espacenet on Sep. 29, 2024. (Year: 2002).*
Machine-generated English language translation of Description of JP2002003797A, 14 pages, retrieved from Espacenet on Sep. 29, 2024. (Year: 2002).*
International Search Report for PCT/EP2020/057906 mailed Jun. 5, 2020.
M. Virtudes Navarro-Banon et al: "Water-based chlorination treatment of SBS rubber soles to improve their adhesion to waterborne polyurethane adhesives in the footwear industry", Journal of Adhesion Science and Technology, vol. 19, No. 11, Jan. 1, 2005, pp. 947-974, XP055623813, GB, ISSN: 0169-4243, DOI: 10.1163/1568561054950997—Cited in the application.
Dictionary of Environmental Protection, Edited by Zhu Hongfa, Jindun Press, 1st Edition, Jun. 2009, 1st printing, p. 355—with English language abstract—Cited in co-pending Chinese application as Common Knowledge Evidence 1.
Application Technology of Rubber Roller and Rubber Coil, China Textile Press, 1st Edition, Oct. 1996, 1st printing, p. 122—with English language abstract—Cited in co-pending Chinese application as Common Knowledge Evidence 2.

* cited by examiner

*Primary Examiner* — Fred M Teskin
(74) *Attorney, Agent, or Firm* — Mary K. Cameron

(57) ABSTRACT

The present invention relates to a process for modifying the surface polarity of elastomeric rubber substrates to facilitate their cold bonding to other rubber substrates or non-elastomeric substrates of a different material, preferably metal, by chlorinating the elastomeric rubber substrate surface by treatment with a chloride-containing composition and a peroxymonosulfate-containing composition. Further aspects relate to the thus-obtained surface-modified rubber substrates, processes of bonding them to other substrates by use of an adhesive, as well as the thus-obtained bonded substrates.

20 Claims, No Drawings

US 12,398,216 B2

PROCESS FOR MODIFYING THE SURFACE POLARITY OF RUBBER SUBSTRATES

FIELD OF THE INVENTION

The present invention relates to a process for modifying the surface polarity of elastomeric rubber substrates to facilitate their cold bonding to other rubber substrates or non-elastomeric substrates of a different material, preferably metal, by chlorinating the rubber substrate surface by treatment with a chloride-containing composition and a peroxymonosulfate-containing composition. Further aspects relate to the thus obtained surface-modified rubber substrates, processes of bonding them to other substrates by use of an adhesive as well as the thus obtained bonded substrates.

BACKGROUND

For various applications preformed parts made of elastomeric materials need to be bonded to another elastomeric material or different materials, such as glass, metals or plastics. Achieving sufficient bonding strength between those materials is challenging, as existing adhesives for non-elastomeric materials exhibit no or insufficient adhesiveness on elastomers, while known adhesives for elastomers have insufficient water and vapor resistance.

While it is possible to overcome some of the existing drawbacks by using hot melt adhesives, low curing temperatures are desired for most applications where epoxy adhesives are used. Low curing temperatures are desirable as they save energy as well as reduce thermal impact on the substrates. Additionally, thermal stresses due to different heat speed or thermal elongation of the substrates can be minimized.

In recent years, photochemical and chemical techniques, such as halogenation, etching, grafting, oxidation, crosslinking, and physical methods, such as corona discharge, plasma treatment, electron or ion beam treatment, flame or laser treatments, have been widely used for the purpose of rubber surface modification that is needed to promote the adhesiveness of common cold curing adhesives on said rubber substrates. The simplest mechanism is to mechanically roughen the surface, but this has limited effectiveness.

Regarding halogenation techniques, there are different types of surface treatments based on organic solvents, e.g. trichloroisocyanuric acid in ethyl acetate or N-halo amides in solvents, or aqueous solutions, e.g. sodium hypochlorite, known in the art. For example, U.S. Pat. No. 4,500,685 A describes the use of N,N-dihalosulfonamides in a waxy matrix for the halogenation of vulcanized rubber surfaces. International patent publication WO 2000/05363 A1 describes the halogenation of rubber surfaces with acidified hypochlorite solutions, chlorine and hydrochloric acid in an organic solvent, chlorine or fluorine containing gases and mixtures of two or more thereof. The use of trichloroisocyanuric acid is, for example, described by M. Virtudes Navarro-Bañón in Water-based chlorination treatment of SBS rubber soles to improve their adhesion to waterborne polyurethane adhesives in the footwear industry" (J. of Adhesion Science and Technology 2005, 19(11), pages 947-74). All of these methods are based on the activation of the double bonds in the rubber chains, creating halogen-carbon atoms and thus increasing the surface polarity. The increased surface polarity then accounts for better compatibility with the commonly used 2K adhesives.

Existing techniques that use organic solvents are undesirable due to the high content of toxic and flammable solvents and the resulting health and safety issues. Techniques based on hypochlorite have been found to be disadvantageous due to stability issues and a side reaction that develop free oxygen reducing treatment performance.

There is thus need in the art for alternative methods that allow halogenation of rubber surfaces to facilitate their cold bonding without having the drawbacks of existing methods.

SUMMARY

The present invention meets this object and provides a process for modifying the surface of an elastomeric rubber substrate using an aqueous solution of a chloride salt and an aqueous solution of a peroxymonosulfate salt. The newly discovered method is based on the property of the persulfate to act as a strong oxidizing agent that reacts readily with the chloride to generate sulfate and free chlorine. The free chlorine can then react with the double bonds in the rubber surface and provide a chlorinated surface of the treated rubber substrate. As a result the surface polarity of the rubber increases and the adhesion of commonly used adhesives on its surface is improved.

In a first aspect, the present invention thus relates to a process for modifying the surface of an elastomeric rubber substrate, wherein the process comprises
  (a) applying a first and a second composition to the elastomeric rubber substrate surface, wherein the first composition is an aqueous composition comprising chloride ($Cl^-$), preferably sodium chloride, and the second composition is an aqueous composition comprising peroxymonosulfate ($HSO_5^-/SO_5^{2-}$), preferably an alkali metal peroxymonosulfate, more preferably potassium peroxymonosulfate ($KHSO_5$);
  (b) optionally applying a third composition comprising activated carbon; and
  (c) incubating the first, second and optionally third composition with the rubber substrate for a time period and under conditions that allow chlorination of the elastomeric rubber surface.

In a further aspect, the invention relates to the elastomeric rubber substrate having a chlorinated surface area that are obtainable according to the processes of the invention.

A still further aspect relates to a process for forming a bond between a first and a second substrate, wherein the first substrate is an elastomeric rubber substrate according to the invention or obtained according to the process of the invention and the second substrate is a rubber or metal substrate, wherein the process comprises:
  (a) applying an adhesive composition to the to-be-bonded surface of the rubber or metal substrate, wherein the adhesive composition preferably is a 2K epoxy, polyurea, polyurethane or silicone adhesive comprising a resin formulation and a hardener formulation;
  (b) contacting the chlorinated surface of the rubber substrate and the surface of the metal substrate with the applied adhesive under pressure to form the bond.

In a still further aspect, the present invention is directed to a bonded product obtainable according to the processes described herein.

DETAILED DESCRIPTION

"At least one", as used herein, relates to at least one and comprises 1, 2, 3, 4, 5, 6, 7, 8, 9 or more of the referenced species.

The present invention is based on the inventors' surprising finding that by using the processes described herein, on the one hand the issues related to the use of organic solvents can be avoided while on the other hand the developed process is more effective than known processes that use hypochlorite, as no oxygen is formed during the reaction. In addition, as the utilized persulfate is much more reactive, reaction times can be significantly shortened, from about 8 hours for hypochlorite treatments to only about 5 to 60 minutes for persulfate-based modification reactions. Finally, it has been found that the invented process allows the generation of higher amounts of free chlorine due to the possibility to use higher chloride concentrations than hypochlorite concentrations, with the latter suffering from stability issues at high concentrations, which additionally increases performance of the process. It has further been found that the unreacted chlorine can advantageously be bound by use of activated carbon. Thus, the release of free chlorine gas during the reaction can be minimized.

The first composition used is preferably an aqueous solution of a chloride salt, containing chloride ions. The chloride salt is preferably an alkali metal chloride salt, such as potassium or sodium chloride, with sodium chloride due to its easy availability, costs and high water solubility being particularly preferred. The first composition contains the chloride ions preferably in a concentration of 1 M (mol/L) to 6M chloride, more preferably 4M to 6M (based on $Cl^-$ ions). The amount used is in principle only limited by the solubility of the salt.

In a preferred embodiment, the first composition is basic, preferably has a pH value of greater than 8, more preferably greater than 10, most preferably greater than 12. Preferably, the first composition contains a hydroxide, which is preferably added as an alkali metal hydroxide. More preferably, the first composition contains sodium and/or potassium hydroxide, most preferably sodium hydroxide. The benefit of an additionally added hydroxide, especially sodium and/or potassium hydroxide, is that it reduces the unreacted free chlorine released in the air. An additional advantageous effect is that, if a hydroxide has been added, the third component, the active carbon, is not needed. Preferably, the first composition contains the hydroxide, especially sodium and/or potassium hydroxide, in a concentration of 0.5 M (mol/L) to 3 M (based on $OH^-$ ions), more preferably 1M to 3M.

The second composition is preferably an aqueous composition comprising a peroxymonosulfate salt, containing peroxymonosulfate ions ($HSO_5^-/SO_5^{2-}$). Preferred are alkali metal salts, in particular potassium peroxymonosulfate ($KHSO_5$). The peroxymonosulfate concentration preferably ranges from 10M to 30M persulfate, more preferably 18 to 22M. The second composition may be a solution, but preferably is a paste of the peroxymonosulfate in water or the salt, such as potassium peroxymonosulfate, is only wetted with water.

The first and second composition can, in addition to the chloride and the peroxymonosulfate, respectively, comprise additional components, including but not limited to solvents, filler, thickeners and the like. It is however preferred that they are free of organic solvents, i.e. contain those in concentrations of less than 1 vol.-%.

The chloride- and peroxymonosulfate-containing compositions are used in amounts that maximize the generation of free chlorine. Accordingly, the amount actually used can be determined based on the respective concentration of the solutions employed. Typically, if the concentrations are in the ranges disclosed herein, the first and second composition are used in a weight ratio of about 3:1 to 1:3, preferably about 2:1 to 1:2, more preferably about 1.5:1 to 1:1.5.

In various embodiments, the amount of the first and/or second and/or third composition applied to the elastomeric rubber substrate surface ranges from 500 to 900 $g/m^2$, preferably 600 to 700 $g/m^2$. Again, this is dependent on the concentrations used, but the indicated ranges are particularly preferred if the concentrations disclosed herein are used.

The active carbon (third composition) is preferably used in solid form, such as powder or flakes. It can however also be used in form of an aqueous dispersion and can, in such an embodiment, also contain additional components as indicated above for the other compositions.

The incubation step (c) of the compositions and the rubber surface is carried out for a time period long enough to allow the desired degree of surface modification. Again, this is dependent on the reaction conditions, it has however been found that at ambient conditions (20° C., 1013 mbar) and use of the concentrations given herein, a reaction time of 5 to 60 minutes, preferably 15 to 30 minutes is sufficient to yield the desired halogenated surfaces.

The application of the compositions can be carried out by any suitable means known in the art. If the compositions are liquid, the application can be achieved by spraying, brushing, printing, dipping, casting, and the like. Solid or essentially solid or pasty compositions, such as the activated carbon or the peroxymonosulfate wetted with water can be applied by suitable solid material application techniques.

Prior to the application of the compositions disclosed herein, the rubber substrate surface to be modified may be cleaned, degreased and the like.

In various embodiments of the process of the invention, the rubber surface is first cleaned to remove oil, grease and dirt. After this optional step, the second composition is applied to the surface. Then a cloth is placed on the surface with the second composition applied thereon and preferably the third composition is applied. Thereafter, the first composition is applied on the cloth. The surface is then covered with a foil, such as a plastic foil or similar covering, and the reaction allowed to proceed for about 5 to 30 minutes. Then the foil and the cloth are removed and the surface is washed with water and cleaned/dried with a cloth. Using a first composition with an additional hydroxide, the usage of plastic foil is not needed.

Accordingly, in various embodiments of the invention, the process further comprises the step of cleaning and optionally drying the substrate surface after the incubation step (c).

The elastomeric rubber substrate can be made of rubber, for example be a rubber sheet, or have an elastomeric rubber surface. Rubber materials are widely known in the art and include, without limitation, natural rubber (NR), ethylene-propylene-diene rubber (EPDM), ethylene propylene rubber (EPM), acrylonitrile-butadiene rubber (NBR), polychloroprene, styrene-butadiene rubber (SBR), styrene-butadiene-styrene rubber (SBS), butadiene rubber (BR), isoprene rubber (IR), styrene ethylene butylene styrene rubber (SEBS), and all other rubbers based on copolymers of any two or more of styrene, butadiene, ethylene and isoprene. Particularly preferred are natural rubbers and styrene-butadiene rubber.

The other substrate to be bonded can be made of any material. In various embodiments, it is made of the same rubber material or another rubber material or of metal. The metal substrate can be any metal. Typically, the metals are iron, steel and aluminum as well as alloys thereof. The metal substrate may be plated with other metals, such as zinc, or may be surface-treated, such as having been subjected to a conversion treatment. The metal substrate may consist of the metal or may be surface-coated with a metal.

For the bonding process the adhesive used in accordance with the processes described herein can be any conventional adhesive, preferably 2K adhesive, used for rubber substrate bonding in the field. Commonly used adhesives are those based on epoxides, polyurea, silicones or polyurethanes. Such 2K adhesives usually comprise a resin and a hardener, typically in form of separate formulation that are combined directly before application. The formulations are designed such that once combined the polymerization reaction starts and proceeds until the composition is fully cured. The curing behavior and time depend on the resins and hardeners used.

For the usage of polyisocyanate-based adhesives, like polyurea-based adhesives or polyurethane-based adhesives, the adhesive crosslinks via constituents containing NCO groups and acid H groups. Examples contain as a resin component the known NCO group-containing prepolymers or polyisocyanates, while the known oligomers or polymers containing OH, NH, SH, COOH groups, preferably OH and/or NH, which can react with the NCO groups of the other component, can be used as hardener component. In order to obtain a network, it is convenient for at least two NCO groups and at least two in particular OH groups to be contained in the crosslinking constituents. The additives known per se can moreover be included in the adhesive. These are constituents with which certain properties of the adhesive can be adjusted and influenced.

The resin component preferably contains at least one polyisocyanate and/or at least one polyurethane prepolymer bearing at least two isocyanate groups or a mixture of such. PU prepolymers can be obtained for example by reacting a polyol component with an at least difunctional isocyanate in stoichiometric excess.

PU prepolymers within the meaning of the present invention are reaction products of compounds bearing OH groups or NH groups with an excess of polyisocyanates. They are the polyols known for adhesive applications or corresponding compounds having secondary and/or primary amino groups. OH-containing starting compounds are preferred. Polyols having a molecular weight of up to 20,000 g/mol, in particular from 200 to 10,000 g/mol (number-average molecular weight, MN, as can be determined by GPC), are suitable in particular for synthesizing said prepolymers. They can be polyols based on polyethers, polyesters, polyolefins, polyacrylates, alkylene polyols, for example. In another embodiment such compounds having NH groups are used.

The polyisocyanates known per se having two or more isocyanate groups, such as aliphatic, cycloaliphatic or aromatic isocyanates, can be used directly or as polyisocyanates in the prepolymer synthesis. One embodiment uses monomeric, oligomeric or polymeric isocyanates as resin component. Mixtures of prepolymers and polyisocyanates are also possible. All known polyisocyanates can be used in principle, in particular the isomers of methylene diisocyanate (MDI) or toluylene diisocyanate (TDI), tetramethylxylylene diisocyanate (TMXDI), 1-isocyanatomethyl-3-isocyanato-1,5,5-trimethylcyclohexane (IPDI), naphthalene-1,5-diisocyanate (NDI), hexane-1,6-diisocyanate (HDI). At least trifunctional isocyanates can also be used, such as are obtained by trimerization or oligomerization of diisocyanates, such as isocyanurates, carbodiimides or biurets.

The hardener component of a suitable two-component polyisocyanate based adhesive must contain at least one compound having at least two groups that react with isocyanate groups. These can be SH, COOH, NH or OH groups, for example. Polyols and amines are preferred.

A large number of polyols are suitable as the polyol component for use as harder component of a polyurethane-based adhesive. For example they can be those having two up to ten OH groups per molecule. They can be aliphatic compounds or aromatic compounds, and polymers bearing an adequate number of Oil groups can also be used. These can be primary or secondary OH groups, provided that they have an adequate reactivity with the isocyanate groups. The molecular weight of such polyols can vary between wide limits, for example from 500 to 10,000 g/mol. The polyols already described above can be included.

Examples of such polyols are low-molecular-weight aliphatic polyols having preferably two to ten OH groups, in particular C2 to C36 alcohols. Another group of suitable polyols are polyethers, for example. These are the reaction products of alkylene oxides having 2 to 4 C atoms with low-molecular-weight di- or trifunctional alcohols. The polyether polyols should have a molecular weight of in particular 400 to 5000 g/mol. OH-containing poly(meth)acrylates or polyolefins are also suitable.

Polyester polyols are a further suitable group of polyol compounds for use in component B. The polyester polyols that are known for adhesives can be used. They can for example be the reaction products of diols, in particular low-molecular-weight alkylene diols or polyether diols, with dicarboxylic acids. These can be aliphatic or aromatic carboxylic acids or mixtures thereof. Such polyester polyols are known to the person skilled in the art in many forms and are available commercially. These polyester polyols should in particular have a molecular weight of in particular 200 to 3000 g/mol. These also include polymeric lactones or polyacetals, provided that they have at least two functional groups and a corresponding suitable molecular weight.

As hardener component for polyurea-based adhesives the used amine is preferably a sterically hindered amine. Suitable sterically hindered amines having two or more amine groups, preferably two amine groups are aspartic ester amines or aromatic diamines. Examples of aromatic diamines are those sterically hindered to reduce reactivity when combined with polymeric isocyanate of the resin component. Such aromatic amines include, but are not limited to toluene diamine, 1-methyl-3,5-diethyl-2,4-diaminobenzene, 1-methyl-3,5-diethyl-2,6-diaminobenzene (also known as DETDA or diethyl toluene diamine), di(m-ethylthio) toluene diamine, 1,3,5-triethyl-2,6-diaminobenzene, toluene diamine derivatives containing halogen groups, cyano groups, alkoxy, alkylthio, alkenyl or carbonylic moieties, m-phenylene diamine, p-phenylene diamine, 4',4'-methylenedianiline, 4,4'-diaminodiphenyl sulfone, 2,6-diamino-pyridine, 4,4'-methylene-bis-(3-chloroaniline), 4,4'-methylene-bis-(3-chloro-2,6-diethylaniline), 4,4-methylene-bis-(3-chlor-2,5-diethylaniline, 3,3'-di-isopropyl-4,4'-diaminodiphenylmethane, 4,4'-bis-(sec-butylamino)diphenylmethane (SBMDA), 3,5,3',5'-tetraethyl-4,4'-diaminodiphenylmethane, propylene-di-4-aminobenzoate, isobutyl 4-chloro-3,5-diaminobenzoate, bis-(2-aminophenyl) disulfide, bis-(4-aminophenyl)disulfide, 3,3'-carbomethoxy-4,4'-diamino diphenylmethane, 1,2-bis(2-aminophenylthio)ethane, dimethylthiotoluenediamine (DMTDA), 0,1,8-diamino-p-menthane, $\alpha,\alpha,\alpha',\alpha'$-tetramethyl xylene diamine, N,N'-ditertiary-butylethylene diamine, and mixtures thereof.

In case of silicon-based adhesives, the known one and two component silicone adhesives can be used. Preferred are two component silicone adhesives. The silicone adhesive comprises one or more poly(diorganosiloxanes). These poly(diorganosiloxanes) are cross-linkable. Cross-linking may be carried out via reactive end groups or by end groups of the poly(diorganosiloxanes) that can be converted into reactive groups. All customary poly(diorganosiloxanes) can be used. For example, such poly(diorganosiloxanes) are known well for the production of adhesives or sealants and are commercially available.

The poly(diorganosiloxane) can preferably be a poly(diorganosiloxane) having hydroxyl end groups and/or can be a poly(diorganosiloxane) having alkoxysilyl end groups. Hydroxyl-group-terminated poly(diorganosiloxanes) and alkoxysilyl-group-terminated poly(diorganosiloxanes) are known and commercially available. The poly(diorganosiloxane) is preferably a poly(dialkylsiloxane), wherein the alkyl radicals preferably have 1 to 5, and more preferably 1 to 3, carbon atoms, and particularly preferably are methyl groups. Most preferable are hydroxyl-group-terminated poly(dimethylsiloxanes) and Methoxysilyl-group-terminated poly(dimethylsiloxanes), which are preferably used in combination contain each of them in one component of a 2K silicon-based adhesive.

The silicone adhesives further include one or more cross-linking agents for poly(diorganosiloxanes), which can be all cross-linking agents known in technology for this purpose. For example, the cross-linking agent is preferably selected from a tetraalkoxysilane, organotrialkoxysilane, diorganodialkoxysilane and/or oligo(organoalkoxysilane), tetrakis ketoximosilane, organotris ketoximosilane, diorganobis ketoximosilane and/or oligo(organoketoximosilane), which are optionally functionalized with one or more heteroatoms in the organyl group, or mixtures thereof. Suitable examples are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane, tetra-n-butoxysilane, methyltris(methyl-ethylketoximo)silane, phenyltris(methyl-ethylketoximo)silane, vinyltris(methyl-ethyl-ketoximo)silane, methyltris(isobutylketoximo)silane or tetra(methyl-ethylketoximo)silane. Methyltrimethoxysilane, vinyltrimethoxysilane, tetraethoxysilane, methyltris(methyl-ethylketoximo)silane, vinyltris(methyl-ethylketoximo)silane and methyltris(isobutylketoximo)silane.

As an optional constituent, the silicone adhesive, and more particularly the two-component silicone formulation, can further include one or more condensation catalysts. This serves as a catalyst for cross-linking the polydiorganosiloxanes. Preferred condensation catalysts are organyl compounds and/or metal or metalloid complexes, in particular from the groups Ia, IIa, IIIa, IVa, IVb or IIb of the periodic table of elements, such as Sn compounds, Ti compounds, for example titanates, and borates, or mixtures thereof. Preferred organotin compounds are dialkyltin compounds, for example selected from dimethyltindi-2-ethylhexanoate, dimethyl tin dilaurate, di-n-butyltin diacetate, di-n-butyltindi-2-ethylhexanoate, di-n-butyltin dicaprylate, di-n-butyltindi-2,2-dimethyloctanoate, di-n-butyltin dilaurate, di-n-butyltin-distearate, di-n-butyltin dimaleinate, di-n-butyltin dioleate, di-n-butyltin diacetate, di-n-octyltindi-2-ethylhexanoate, di-n-octyltindi-2,2-dimethyloctanoate, di-n-octyltin dimaleinate, and di-n-octyltin dilaurate.

If epoxy-based adhesives are used, in the epoxy resin formulation of the 2K epoxy adhesive, the epoxy resins may include any commonly known and used epoxy resin. Suitable epoxy resins preferably include epoxy resins with 1 to 10 epoxy groups per molecule. These epoxy groups can be 1,2-epoxy groups. The epoxy resin can in principle be a saturated, unsaturated, cyclic or acyclic, aliphatic, alicyclic, aromatic or heterocyclic polyepoxide compound. Examples of suitable epoxy resins include polyglycidyl ethers, commonly prepared by reacting epichlorohydrin or epibromohydrin with a polyphenol in the presence of alkali as well as polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins. Polyphenols suitable for this purpose include, for example, resorcinol, pyrocatechol, hydroquinone, bisphenol A (2,2-bis(4-hydroxyphenyl)propane), bisphenol F (bis(4-hydroxyphenyl)methane), 1,1-bis(4-hydroxyphenyl)isobutane, 4,4'-dihydroxybenzophenone, 1,1-bis(4-hydroxyphenyl)-ethane, 1,5-hydroxynaphthalene. Likewise suitable are diglycidyl ethers of ethoxylated resorcinol (DGER), e.g., from Indspec Chemical Corporation, and diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbisphenol; diglycidyl ethers of alkylene glycols with 2 to 20 carbon atoms and poly(ethylene oxide) or poly(propylene oxide) glycols.

Additional suitable epoxy resins are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other suitable epoxy resins are polyglycidyl esters of polycarboxylic acids, examples being reaction products of glycidol or epichlorohydrin with aliphatic or aromatic polycarboxylic acids such as oxalic acid, succinic acid, glutaric acid, terephthalic acid or dimer fatty acid.

Further suitable epoxy resins are derived from the epoxidation products of olefinically unsaturated cycloaliphatic compounds or from natural oils and fats.

In preferred embodiments, the epoxy resins have 1 to 10 epoxy groups and are selected from the group consisting of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol M, bisphenol S, tetramethylbisphenol, diglycidyl ethers of alkylene glycols with 2 to 20 carbon atoms and poly(ethylene oxide) or poly(propylene oxide); polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof, preferably diglycidyl ethers of bisphenol F and diglycidyl ethers of bisphenol A and any combination thereof.

Particular preference is given to the epoxy resins which are derived from the reaction of bisphenol A or bisphenol F and epichlorohydrin. It can be advantageous to use liquid epoxy resins, the liquid epoxy resins preferably being based on bisphenol A and having a sufficiently low molecular weight. The epoxy resins which are liquid at room temperature generally have an epoxide equivalent weight of from 150 to about 220. Such epoxy resins are commercially available under the tradename D.E.R.™ from Dow.

The resin formulations can comprise numerous other components, all of which are well known to those skilled in the art, including but not limited to commonly used adjuvants and additives such as, for example, fillers, plasticizers, tougheners, reactive and/or non-reactive diluents, flow agents, coupling agents (e.g. silanes), adhesion promoters, humectants, tackifiers, flame retardants, wetting agents, thixotropic and/or rheology agents (e.g., fumed silica) aging and/or corrosion inhibitors, stabilizers and/or coloring agents. Based on the requirements of the adhesive and its application and in view of the production, flexibility, strength, and adhesive bonding to the substrate, the auxiliaries and additives are incorporated in varying amounts in the composition. In various embodiments, the resin formulation comprises fillers and/or coloring agents, but typically in amounts of not more than 10 wt.-% relative to the resin formulation.

The hardener formulation, in various embodiments, comprises compounds that are capable of cross-linking with epoxy groups on the epoxy resin. Any hardener suitable for a 2K epoxy may be used. Preferred hardeners include mercaptans, polymeric amines (polyamines) and polymeric amides (polyamides) (including, e.g., polyamidoamines), low molecular weight amines, and combinations thereof. Also preferred are adducts of the afore-mentioned hardeners with epoxy resins such as those described above.

In various embodiments, preferred polyamines include a polyetheramine-epoxy adduct, that is, a reaction product of a stoichiometric excess of an amine prepolymer with an epoxy resin. Polyamine hardeners tend to react more slowly than low molecular weight amines, but can add flexibility to the cured adhesive. The amine prepolymer used for adduct formation may be any amine prepolymer that has at least two amine groups in order to allow cross-linking to take place. The amine prepolymer comprises primary and/or secondary amine groups, and preferably comprises primary amine groups. Suitable amine prepolymers include polyether diamines and polyether triamines, and mixtures thereof. Polyether diamines are preferred. The polyether amines may be linear, branched, or a mixture. Branched polyether amines are preferred. Any molecular weight polyetheramine may be used, with molecular weights in the range of 200-6000 or above being suitable. Molecular weights may be above 1000, or more preferably above 3000. Molecular weights of 3000 or 5000 are preferred.

Suitable commercially available polyetheramines that can be used for adduct formation or as such include those sold by Huntsman under the Jeffamine® trade name. Suitable polyether diamines include Jeffamines in the D, ED, and DR series. These include Jeffamine D-230, D-400, D-2000, D-4000, HK-511, ED-600. ED-900, ED-2003, EDR-148, and EDR-176. Suitable polyether triamines include Jeffamines in the T series. These include Jeffamine T-403, T-3000, and T-5000. Polyether diamines are preferred, and polyether diamine of molecular weight about 400 (e.g. Jeffamine D-400) is most preferred. The equivalents of any of the above may also be used in partial or total replacement.

When a polyamide is included, any polyamide hardener may be used. Some preferred polyamides include reaction products of a dimerized fatty acid and a polyamine. Examples of such polyamides include those available under the trade designations Versamid®.

Suitable mercaptans include difunctional mercaptans, such as 1,8-dimercapto-3,6-dioxaoctane (DMDO), either as monomers or as epoxy adducts, that is, reaction products of a stoichiometric excess of the mercaptan with an epoxy resin. Particularly preferred are difunctional mercaptan-epoxy adducts.

The hardener composition may comprise a low molecular weight (non-polymeric) amine hardener. Preferred compounds include primary and/or secondary amines having molecular weights up to 300 g/mol, 250 g/mol or 200 g/mol. Aliphatic amine hardeners include those sold under the tradename Ancamine® by Evonik.

In all the above described adducts, the epoxy resin can be any of the above described epoxy resins, but preferably is a bisphenol diglycidyl ether, such as reaction products of bisphenol A with epichlorohydrin.

Any amount of the described hardeners may be used in the present invention.

In the hardener composition, preferably one or more curing accelerators (catalysts) are used, to speed up setting of the adhesive. The curing accelerator preferably works by catalyzing the reaction between the polyamine/polyamide/mercaptan hardeners on the one hand, with the epoxy resin on the other hand. The curing accelerator preferably includes a tertiary amine. A preferred example is 2,4,6-tris(dimethylaminomethyl)phenol, available from Cognis under the name Versamine® E1130. Other suitable polyamines are described in U.S. Pat. No. 4,659,779 (and its family members U.S. Pat. Nos. 4,713,432 and 4,734,332; and EP-A-0 197 892).

The curing accelerator may be present in any amount that suitably accelerates curing of the epoxy adhesive. Preferably, a curing accelerator may be present in amounts of less than 5 wt.-%, more preferably between 0.5 and 2 wt.-% based on weight of the hardener composition.

The curing temperature is preferably less than 60° C., or 50° C., or 40° C. The epoxy adhesive compositions preferably cure at ambient temperature, e.g., around 20° C. or 25° C. The inventive processes are therefore preferably carried out at ambient temperatures, i.e. in a temperature range of about 15 to 40° C. It is permissible but not preferred to heat the inventive epoxy adhesive, e.g., in order to further reduce curing time or to obtain more complete curing.

"About", as used herein in relation to a numeric value, refers to the referenced value 10% of said numeric value.

In various embodiments, the hardener may comprise any one of the additives and auxiliaries disclosed above in connection with the resin composition, like fillers as calcium carbonate or silica.

In the bonding processes, step (b) may be carried out at a temperature of 15 to 30° C. and a relative humidity of 85% or less.

Before steps (a) and/or (b) of the described bonding processes, the rubber and/or metal substrate surfaces may be cleaned to remove dirt, oil, grease etc., all of which may interfere with the bonding process. Suitable cleaning agents are well-known in the art and include Loctite@SF 7063 from Henkel.

Mixing, applying and/or dispensing of the adhesives can be accomplished using simple manual equipment or fully automated systems, all of which are known to those skilled in the art and readily available.

The step of contacting the two substrates for forming the bond under pressure can be carried out using known equipment, such as rolls, plates or other suitable equipment. In preferred embodiments, step (b) is carried out by rolling.

In various embodiments, the whole process can be automated.

As described above, the present invention also encompasses the products obtained by bonding the two substrates in the described processes.

All embodiments disclosed herein in relation to the described processes and formulations are similarly applicable to the claimed products and vice versa. All documents cited herein are hereby incorporated by reference in their entirety.

The invention is further illustrated by the following examples without being limited thereto.

EXAMPLES

Example 1

First composition: 27 wt.-% sodium chloride, 73 wt.-% deionized water.

Second composition: 70 wt.-% potassium peroxymonosulfate ($KHSO_5$), 30 wt.-% deionized water.

Mix ratio of first composition and second composition was 1:1 by weight.

Third composition: 100 wt.-% active carbon (flakes)

2K Polyurea Adhesive

Hardener formulation: 100 wt.-% Ethacure 420 (hindered secondary amine curing agent; Albemarle (US))

Resin formulation: 100 wt.-% Desmodur N3900 (aliphatic polyisocyanate; Covestro, DE)

Hardener and resin were mixed in a ratio of 1:1.3 by weight.

Preparation

Sodium chloride and water were shaken until sodium chloride was completely dissolved. Potassium peroxymonosulfate and water were mixed until the potassium peroxymonosulfate was well wetted.

Process:
(1) The substrates (mild steel, SBR, NR) to be bonded were well cleaned to remove dirt, oil and grease by use of Loctite 7063 (Henkel, DE);
(2) The metal substrates were sandblasted and again cleaned with Loctite 7063;
(3) The second composition containing the peroxymonosulfate was applied to the rubber surface by a plastic spatula;
(4) The rubber was covered with a cloth, the active carbon was applied thereon, followed by the first composition, the surface was covered by a plastic foil and let react for 15 minutes;
(5) The cloth and the foil were removed, the surface washed with water and cleaned with a cloth;
(6) The resin and hardener component of the adhesive were mixed by hand and applied as one single coat on the metal surface for roll peel specimens or the rubber surface for T peel specimens; and
(7) The roll peel specimens (rubber to metal substrates) and T peel specimens (rubber to rubber substrates) were assembled by rolling (20° C., relative humidity <85%.

Testing:

Floating Roll Peel Resistance, relative peel resistance of adhesive bonds between one rigid adherend and one flexible adherend, was tested per ASTM D 3167-03.

Adhesive Peel Strength Testing, peel separation strength of two flexible materials that have been bonded together, T-peel strength was tested per ASTM D1876.

TABLE 1

| Example 1 Test Results | |
|---|---|
| Test | Result |
| Roll Peel with SBR after 3 days at room temperature (ASTM D 3167-03) | 18N/mm |
| Roll Peel with NR after 3 days at room temperature (ASTM D 3167-03) | 14N/mm |
| T Peel with SBR after 3 days at room temperature (ASTM D1876) | 10N/mm |
| T Peel with NR after 3 days at room temperature (ASTM D1876) | 13N/mm |

Example 2

First composition: 27 wt.-% sodium chloride, 73 wt.-% deionized water.

Second composition: 70 wt.-% potassium peroxymonosulfate ($KHSO_5$), 30 wt.-% deionized water.

Mix ratio first and second composition 1:1 by weight.

Third composition: 100 wt.-% active carbon (flakes)

2K Epoxy Adhesive

Resin formulation: 99 wt.-% DER 356 P (Bisphenol-A/F based epoxy resin. Dow), 0.01 wt.-% Defoamer 1244 (Antifoaming agent, Solutia); 0.99 wt.-% Silane A 187 (Epoxy silane, Momentive)

Hardener formulation: 95.99 wt.-% Ancamine 1922A (Evonik), 3.00 wt.-% fumed silica, 1.00 wt.-% tris(dimethylaminomethyl)phenol, 0.01 wt.-% (Antifoaming agent, Solutia)

Hardener and resin were mixed in a ratio of 31:100 by weight.

Preparation:

Sodium chloride and water were shaken until sodium chloride was completely dissolved. Potassium peroxymonosulfate and water were mixed until the potassium peroxymonosulfate was well wetted. DER356, defoamer and epoxy silane were dispersed under dynamic vacuum until homogeneous mixture with a high speed dispenser. Ancamine 1922A, fumed silica, tris(dimethylaminomethyl)phenol and defoamer were dispersed under dynamic vacuum until homogeneous mixture with a high speed dispenser.

Process:
(1) The substrates (mild steel, SBR, NR) to be bonded were well cleaned to remove dirt, oil and grease by use of Loctite 7063 (Henkel, DE);
(2) The metal substrates were sandblasted and again cleaned with Loctite 7063;
(3) The second composition containing the peroxymonosulfate was applied to the rubber surface by a plastic spatula;
(4) The rubber was covered with a cloth, the active carbon was applied thereon, followed by the first composition, the surface was then covered by a plastic foil and reacted for 15 minutes;
(5) The cloth and the foil were removed, the surface washed with water and cleaned with a cloth;
(6) The resin and hardener component of the adhesive were mixed by hand and applied as one single coat on the metal surface for roll peel specimens or on the rubber surface for T peel specimens;
(7) The roll peel specimens (rubber to metal substrates) and T peel specimens (rubber to rubber substrates) were assembled by rolling (20° C., relative humidity <85%.

Testing: Testing was performed as described for Example 1.

TABLE 2

Example 2 Test Results

| Test | Result |
| --- | --- |
| Roll Peel with SBR after 3 days at room temperature (ASTM D 3167-03) | 19N/mm |
| Roll Peel with NR after 3 days at room temperature (ASTM D 3167-03) | 10N/mm |
| T Peel with SBR after 3 days at room temperature (ASTM D1876) | 13N/mm |
| T Peel with NR after 3 days at room temperature (ASTM D1876) | 14N/mm |

Example 3

First composition: 21 wt.-% sodium chloride, 8 wt.-% sodium hydroxide, 71 wt.-% deionized water.

Second composition: 70 wt.-% potassium peroxymonosulfate ($KHSO_5$), 30 wt.-% deionized water.

Mix ratio first and second composition 1:1 by weight.

2K Silicone Adhesive

Hardener formulation: LOCTITE SI 5610 B
Resin formulation: LOCTITE SI 5610 A
Hardener and resin were mixed in a volume ratio of 1:2.

Preparation

Sodium chloride, sodium hydroxide and water were shaken until sodium chloride was completely dissolved. Potassium peroxymonosulfate and water were mixed until the potassium peroxymonosulfate was well wetted.

Process:
(1) The substrates (mild steel, SBR, NR) to be bonded were well cleaned to remove dirt, oil and grease by use of Loctite 7063 (Henkel, DE);
(2) The metal substrates were sandblasted and again cleaned with Loctite 7063;
(3) The second composition containing the peroxymonosulfate was applied to the rubber surface by a plastic spatula;
(4) The rubber was covered with a cloth and the first composition was applied and let react for 15 minutes;
(5) The cloth was removed, the surface washed with water and cleaned with a cloth;
(6) The resin and hardener component of the adhesive were applied by pneumatic gun as one single coat on the metal surface for roll peel specimens or the rubber surface for T peel specimens; (7) The roll peel specimens (rubber to metal substrates) and T peel specimens (rubber to rubber substrates) were assembled by rolling (20° C., relative humidity <85%).

Testing: Testing was performed as described for Example 1.

TABLE 3

Example 3 Test Results

| Test | Result |
| --- | --- |
| Roll Peel with SBR after 3 days at room temperature (ASTM D 3167-03) | 4N/mm |
| T Peel with SBR after 3 days at room temperature (ASTM D1876) | 5N/mm |

What is claimed is:

1. A process of modifying a surface of an elastomeric rubber substrate, comprising steps of:
(a) applying a first composition and a second composition to an elastomeric rubber substrate surface, wherein the first composition is an aqueous composition comprising chloride ($Cl^-$), and the second composition is an aqueous composition comprising peroxymonosulfate;
(b) optionally applying a third composition comprising activated carbon; and
(c) incubating the first and second compositions, and the third composition if present, on the elastomeric rubber substrate surface for a time period and under conditions producing chlorination of the elastomeric rubber substrate surface.

2. The process according to claim 1, wherein the first composition is an aqueous 1M to 6M sodium chloride solution.

3. The process according to claim 2, wherein the second composition is an aqueous 10M to 30M solution of peroxymonosulfate.

4. The process according to claim 3, wherein the first and second composition are applied in a weight ratio of about 3:1 to 1:3.

5. The process according to claim 4, wherein the first and/or second and/or third composition is applied to the elastomeric rubber substrate surface in an amount that ranges from 500 to 900 g/m².

6. The process according to claim 1, wherein step (c) is carried out for 5 to 60 minutes.

7. The process according to claim 1, further comprising a step of cleaning the substrate surface after step (c).

8. The process according to claim 1, wherein the first composition further comprises a hydroxide.

9. The process according to claim 8, wherein the first composition contains the hydroxide in a concentration of 0.5 M to 3 M.

10. The process according to claim 9, wherein the hydroxide comprises sodium and/or potassium hydroxide.

11. The process according to claim 1, wherein the first composition is an aqueous solution of sodium chloride and the second composition is an aqueous solution of potassium monopersulfate.

12. The process according to claim 11, wherein the first composition is present in a concentration of 1M to 6M and the second composition is present in a concentration of 10M to 30M.

13. A process of forming a bond between a first substrate and a second substrate, wherein the first substrate comprises an elastomeric rubber substrate having a chlorinated surface made according to the process of claim 1 and the second substrate is a rubber or metal substrate, wherein the process comprises:
(a) applying an adhesive composition to a to-be-bonded surface of the second substrate;
(b) contacting the chlorinated surface of the first substrate and the to-be-bonded surface of the second substrate with the applied adhesive under pressure thereby forming the bond.

14. The process according to claim 13, further comprising a step of cleaning the rubber and/or metal substrate surfaces prior to steps (a) and/or (b).

15. The process according to claim 13, wherein step (b) is carried out at a temperature of 15 to 30° C. and a relative humidity of 85% or less.

16. The process according to claim 13, wherein step (b) is carried out by rolling.

17. The process according to claim 13, wherein the adhesive composition is a 2K epoxy, polyurea, silicone or polyurethane adhesive comprising a resin formulation and a hardener formulation.

18. The process according to claim 17, wherein the adhesive composition is a 2K polyurea.

19. The process according to claim 17, wherein the adhesive composition is a 2K silicone.

20. The process according to claim 17, wherein the adhesive composition is a 2K polyurethane.

* * * * *